United States Patent [19]
Seglin et al.

[11] 3,850,839
[45] Nov. 26, 1974

[54] MANUFACTURE OF SYNTHESIS GAS

[75] Inventors: Leonard Seglin, New York, N.Y.; Ralph Tracy Eddinger, Princeton Junction, N.J.

[73] Assignee: Cogas Development Company, Princeton, N.J.

[22] Filed: Feb. 11, 1971

[21] Appl. No.: 114,642

[52] U.S. Cl. .................................. 252/373, 23/284
[51] Int. Cl. ............................................. C07c 1/02
[58] Field of Search .......... 252/373; 48/197 R, 206; 208/48

[56] References Cited
UNITED STATES PATENTS

| | | |
|---|---|---|
| 2,546,606 | 3/1951 | Mayland ............................ 252/373 |
| 2,554,263 | 5/1951 | Nelson ............................... 252/373 |
| 2,729,552 | 1/1956 | Nelson et al. ...................... 48/197 |
| 2,803,530 | 8/1957 | Ludeman ........................... 48/206 |
| 2,879,148 | 3/1959 | Atwell ................................ 48/197 |
| 3,171,369 | 3/1965 | Stephens, Jr. et al. ............ 110/28 |
| 3,620,697 | 11/1971 | Wunderlich et al. .............. 252/373 |

Primary Examiner—Leon Zitver
Assistant Examiner—A. Siegel

[57] ABSTRACT

Synthesis gas is prepared by contacting coal derived char particles with steam in a fluid-bed gasifier wherein heat for the endothermic reaction is supplied by passing through the gasifier, a stream of inert pellets heated by contact with hot combustion gases produced by burning the fines collected from the external cyclone of the gasifier.

7 Claims, 3 Drawing Figures

PATENTED NOV 26 1974
3,850,839

INVENTORS
LEONARD SEGLIN
RALPH TRACY EDDINGER
BY

MANUFACTURE OF SYNTHESIS GAS

BACKGROUND OF THE INVENTION

A. Field of the Invention

This invention relates to the production of synthesis gas. It is particularly concerned with providing heat requirements in a fluid-bed gasification system of producing synthesis gas.

B. Description of the Prior Art

The gasification of carbonaceous solids with steam to produce a synthesis gas containing high concentrations of hydrogen and carbon monoxide has been practiced for many years. In fact, it is one of the classic processes of the fuel industry. Known as the water gas reaction, it can be depicted by the following idealized equation.

$$C + H_2O \xrightarrow{1600°F} CO + H_2$$

In the large scale manufacture of synthesis gas, one of the chief difficulties is providing sufficient heat to sustain the highly endothermic reaction. Probably no other single aspect of the process has so engaged the attention and efforts of fuel technologists. Although many solutions have been proposed in dealing with this long standing problem, a completely satisfactory solution has yet to be found.

Commercial gasification of solid fuel began during the latter half of the 19th century with the development of the fixed-bed process. In this approach, a bed of carbonaceous solid, usually coke, is alternately heated and reacted with steam to produce blue or water gas. The coke is heated red hot by partial combustion followed by introduction of the steam until the endothermic heat has slowed the reaction (or cooled the bed below the reaction temperature). The bed is again blasted with air followed by steam and the cycles repeated.

During the 1920's, fluidized bed technology was applied to gasification on a commercial scale and generally has displaced the older fixed-bed system. Although fluid-bed gasification of carbonaceous solids has been extensively developed, the providing of reaction heat, particularly in commercial installations, continues to be a problem. One of the more recent approaches to this difficulty involves the withdrawal of a recycle stream from the gasification bed, and its partial combustion to raise its temperature to such a point that, on recycle back to the reactor along with fresh carbonaceous solids, it provides a substantial portion of the necessary heat of reaction. Such a scheme is illustrated, for example, in Patton et al. U.S. Pat. No. 3,440,117 issued Apr. 22, 1969.

Unfortunately, the use of recycle streams for heating fluid beds results in the production of fines which tend to be blown out of the synthesis gas reactor with the synthesis gas along with the fines produced in the reactor by breakdown of char particles due to reaction with steam. The fines either are lost or must be recovered and returned to the process at some expense. In addition, the buildup of fines necessitates reduction in gas velocity in the reactor, thereby reducing over-all throughput.

In our copending application Ser. No. 50,700, filed June 29, 1970, we describe a char recycle technique whereby the buildup of fines is greatly lessened. In this process, a recirculating char stream from the gasification zone of the fluid-bed reactor is heated, externally of the zone, with combustion gases derived by burning a portion of the carbonaceous solids, by utilizing, as a fuel for the production of combustion gases to heat the recirculating char stream, fines from the process separated from the stream of synthesis gas coming out of the gasification reactor, most preferably by an external cyclone, maintaining contact between the combustion gases and the recycle stream for at least sufficient time to get heat interchange (a fraction of a second), but not more than a few seconds, to minimize chemical reaction between the recycle char and the combustion gases.

Although a decided advance, the process aforesaid does contribute a certain amount of fines due to some attrition of the char in the recycle loop. Manifestly, reduction of fines to an even lower level is a desideratum of the art.

SUMMARY OF THE INVENTION

It has now been discovered that the heat requirements for the production of synthesis gas by fluid-bed gasification of carbonaceous solids without significant formation of fines can be realized by passing through the gasifier a stream of inert pellets heated by contact with hot combustion gases produced by burning fines collected from the external cyclone of the gasifier.

DRAWING

FIGS. 1, 2 and 3 of the drawing, annexed to and made a part of the application, show a stylized flow sheet of the invention.

DETAILED DESCRIPTION OF THE PREFERRED EMBODIMENT(S)

The present process is an improvement in the known processes for producing synthesis gas from solid carbonaceous materials in a fluid-bed. In such a process, the carbonaceous raw material, ground to a size such that it can be suspended in a gas stream to form a suspended bed of solids surrounded with gas which acts like a fluid, is reacted with steam in accordance with the following equation aforesaid. The temperature at which the process goes in the indicated direction depends on the nature of the carbonaceous material; it is generally from about 1,600°F to about 2,000°F, preferably about 1,800°F. At these temperatures, raw coals will fuse; hence, the solid carbonaceous material is generally a char of some kind — ranging from low-temperature coal chars to cokes derived from coal and petroleum.

In any case, the reaction is endothermic, requiring about 2,700 calories per gram of carbon. Part of this heat can be supplied from the superheat put into the steam used in the process, as reactant and as fluidizing gas for the bed of carbonaceous material, but large amounts of additional heat must be supplied. This is generally done by combustion of a portion of the stream of material fed into the process, to produce heat which is used in the process.

In accordance with this invention, this heat is supplied by introducing into the gasification zone, a circulating stream of inert, refractory pebbles which have been heated by contact with the hot combustion gases produced by burning the fines which are expelled from the gasifier. The pebbles, in passing through the gasification zone, transfer their heat to the reacting system, from whence they are conveyed back to the combustion zone of burning fines to be reheated for another passage through the gasification zone and so on in a continuous stream between the two stations.

Figure 1:
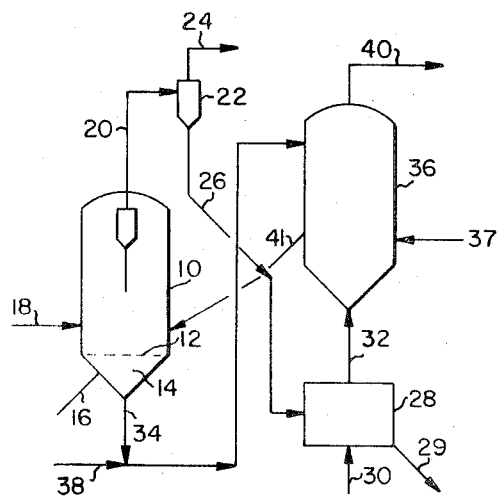

Referring to FIG. 1 of the drawing, we provide a gasifier 10 in which a bed 12 of char is maintained on a grid 14 by a fluidizing stream 16 of superheated steam. Carbonaceous material is fed into the bed 12 via entry port 18.

In the gasifier 10, the hot carbonaceous material in the bed 12 reacts with the steam to form synthesis gases, mostly CO and $H_2$, but also containing some $CO_2$ and $H_2O$. These gases, containing entrained solids, are exhausted through a line 20 to a cyclone system 22, preferably external to the gasifier vessel 10 for ease of maintenance. The cyclone system may consist of a single unit, but is preferably a series of cyclones. In the cyclone system, the solids entrained in the synthesis gas stream are separated from the stream, which exits from the process through line 24. The larger solids in a complex cyclone system are returned to the reactor; but the finer solids are withdrawn through line 26 to a combustion chamber 28.

The solids fed to combustion chamber 28 are selectively the finest solids coming from the fluid-bed in gasifier 10, since the synthesis gas stream picks up this fines fraction selectively. By burning them, fines are prevented from building up in the system, thus reducing the load on the cyclone system 22, permitting a much smaller capital investment and less maintenance in this area. At the same time, selective removal of fines stabilizes the size consist of the bed solids, permitting a high throughput of gas without expelling solids from the bed.

The combustor 28 is preferably a slagging combustor, in which the ash content of the fuel is removed as a molten slag through line 29. Almost all of the ash fed to the gasifier is removed in this stream, with only a very small quantity being discharged with the stack gases.

The combustion is done with air preferably preheated to about 800° to 1,000°F and supplied from a line 30; the hot combustion gases are conveyed by line 32 into pebble heater vessel 36, where they meet with a stream of circulating pebbles which are drawn from the bottom of the gasifier 10 by a line 34 which feeds into pebble heater 36. The pebbles are moved by transport gases entering line 34 from line 38. The heated pebbles leave pebble heater 36 via line 41 and enter the gasifier 10 above bed 12. Make-up pebbles are supplied to the pebble heater through line 39. The combustion gas stream and fly ash are drawn off through line 40.

Figure 2:
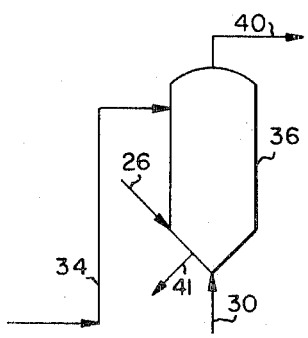

FIG. 2 is identical to FIG. 1 except the fines are burned directly in a fluidized-bed pebble heater 36. In this case, the ash is carried with the flue gas through line 40 and emerges out of the top of pebble heater 36.

Figure 3:
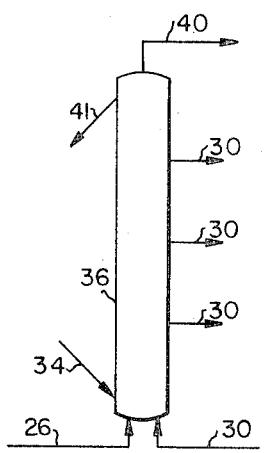

FIG. 3 is another alternative to FIG. 1 except that pebble heater 36 is an entrained type reactor. The fines and a limited amount of air enter via lines 30 into the reactor at several levels along the reactor to maintain a temperature of 1,900°F. As with the modification of FIG. 2, the ash exits with the flue gas out the top of pebble heater 36.

The residence time in pebble heater 36 must be long enough to ensure heat transfer from the hot gases to the pebbles. Assuming an 1,800°F temperature in the gasifier and a combustion gas temperature of about 4,000°F, it requires less than 0.1 second to get the temperature of minus ⅜-inch pebbles up to about 2,100°F.

We can use any carbonaceous solid which can be fluidized as a raw material, particularly coal chars and petroleum cokes. Advantageously, we use char such as is produced in accordance with U.S. Pat. Nos. 3,375,175 to Eddinger et al., issued Mar. 26, 1968 or the calcinate described in 3,140,241 to Work et al, issued July 7, 1964. The apparatus of this invention may be combined with the apparatus of these patents, to increase the over-all yield of fluids from those processes, by gasifying the char resulting therefrom.

The pellets used in the process of the invention are hard, refractory particles of sufficient density whereby they are not fluidized in the gasification zone but pass downward through the fluidizing medium while transferring their heat content to the gasification medium. Once the pebbles emerge from the bottom of the reactor, they are swept along by the transport gases back to the pebble heater. The pellets are desirably spheres having a diameter of from about minus ¼-inch to about minus ½-inch, preferably minus ⅜-inch. An especially convenient and low cost material is minus ⅜-inch pelletized, partially vitrified char ash by calcining to about 2,200°F. In general, the pebbles should have a specific heat of from about 0.230 to about 0.275 and a specific gravity of from about 2.30 to about 4.00. The pellets should have a specific gravity at least about 10 percent greater than the carbonaceous solid so as not to be substantially fluidized therewith. Coal char has a specific gravity of about 1.7.

The concentration of the pellets in the gasifier depends on their specific heat, the heat requirements of the gasifier, and the respective residence times of the pellets and of the char in the bed. In general, a weight ratio of pebbles to char about 1 to 1 to 3.5 to 1 is satisfactory.

Examples of suitable pellet material are listed in the following table.

TABLE I

| Material | Mean Specific Heat Between 32 and 1800°F, Btu/lb. °F. | True Specific Gravity |
| --- | --- | --- |
| Mullite ($3Al_2O_3 \cdot 2SiO_2$) | 0.245 | 3.00–3.20 |
| Sillimanite ($Al_2O_3 \cdot SiO_2$) | 0.270 | 2.75–2.85 |
| Alumina ($Al_2O_3$) | 0.255 | 3.75–3.95 |
| Magnesia (MgO) | 0.277 | 3.40–3.60 |
| Pelletized Char Ash | 0.255 | 2.55–2.65 |
| Silicon Carbide | 0.260 | 3.17 |

EXAMPLE 940,191 lb./hr. of make-up char produced in accordance with U.S. Pat. No. 3,375,175 at 1,000°F, containing 13.1 percent ash or 123,010 lb./hr. (stream 18) is combined with 34,500,000 lb./hr. of recycle pebbles (stream 41) in a gasifier (10), fluidized with 1,120,135 lb./hr. of steam (stream 16). The gasifier (10) operates at 1,600°F and 35 psig, and the heat for the gasification reaction (2,700 calories per gram carbon):

$$C + H_2O \rightleftarrows CO + H_2$$

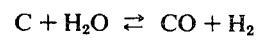

(1)

is supplied by recycle pebbles, which gives up their sensible heat upon cooling from 1,900°F, the pebbles entering temperature, to 1,600°F, the gasifier operating temperature. The water-gas shift reaction $$CO + H_2O \rightleftarrows H_2 + CO_2 \qquad (2)$$

also occurs to some extent under the conditions of the gasifier.

The pebbles, being denser than the char, sink to the bottom of the bed under the fluidizing action of the steam and product gases. The pebbles, in the amount fed (34,500,000 lb./hr.) are continuously withdrawn from the bed via stream 34, and are moved by transport gases from line 38 back to pebble heater 36. 410,187 lb./hr. of char fines (stream 26) are eluted from the gasifier and collected in external cyclone separators are burned with 3,615,235 lb./hr. of air preheated to 540°F. These char fines contain the total ash entering with the make-up char, or 123,010 lb./hr.

The product gases (stream 24) from the gasifier are close to the equilibrium for Reactions (1) and (2) above, and contain:

| Compound | lb./hr. | Vol.% |
|---|---|---|
| $H_2O$ | 266,374 | 13.9 |
| CO | 1,145,286 | 38.4 |
| $H_2$ | 94,862 | 44.6 |
| $CO_2$ | 143,613 | 3.1 |
| Total | 1,650,135 | 100.0 |

The char fines combust completely to carbon dioxide, thereby heating the recycle pebbles to 1,900°F. The ash in the make-up char, (123,010 lb./hr.) is removed from the system by elution out of the fluidized bed by the combustion gases (stream 40). The combustion gases, leave at about 1,900°F and 35 psig. After removal of dust, heat and power are recovered from these hot combustion gases by sequential passage through a waste boiler, a gas turbine and finally an air preheater.

What is claimed is:

1. In the process of making synthesis gas by the gasification of a carbonaceous solid with steam in a fluidized bed, the improvement of providing heat to the process comprising burning fines separated from the synthesis gas stream withdrawn from above the fluidized bed, contacting the combustion gases from the combusted fines with preformed inert refractory pebbles of substantially spherical shape for sufficient time to heat the pebbles, introducing the heated pebbles into the gasification zone, the pebbles being of such size and specific gravity that they are not fluidized with the carbon in the bed and sink by gravity to the bottom of the gasifier, and circulating the pebbles out of the bottom of the gasifier, after they have given up heat to the reaction taking place in the gasifier, to be reheated.

2. The process of claim 1 wherein the pebbles are circulated in a continuous path downward through and out of the lower end of the gasifier and back through the combustion zone of burning fines.

3. The process of claim 1 wherein the fines are burned under conditions which convert the ash to molten slag.

4. The process of claim 1 wherein the fines are burned in a fluidized bed of recycle pebbles and carbonaceous solids.

5. The process of claim 1 wherein the fines are burned in an entrained type of reactor and wherein the pebbles are transported and heated.

6. The process of claim 1 wherein the carbonaceous solid is coal char.

7. The process of claim 1 wherein the refractory pebbles are made from coal ash.

* * * * *